(12) United States Patent
Nikonov et al.

(10) Patent No.: US 7,050,663 B2
(45) Date of Patent: May 23, 2006

(54) INTEGRATED OPTICAL CIRCUIT HAVING AN INTEGRATED ARRAYED WAVEGUIDE GRATING (AWG) AND OPTICAL AMPLIFIER(S)

(75) Inventors: Dmitri E. Nikonov, San Jose, CA (US); Christopher J. Scholz, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/982,227

(22) Filed: Oct. 17, 2001

(65) Prior Publication Data

US 2006/0029323 A1 Feb. 9, 2006

(51) Int. Cl.
*G02B 6/12* (2006.01)

(52) U.S. Cl. .................... 385/14; 385/37; 385/130; 385/132; 398/140; 398/141; 398/142

(58) Field of Classification Search .................. 385/14, 385/31, 129, 2, 24, 11, 30, 37, 130–132; 398/140–142
See application file for complete search history.

(56) References Cited

U.S. PATENT DOCUMENTS

| 5,452,116 | A | * | 9/1995 | Kirkby et al. | ............... 359/124 |
| 5,459,801 | A | * | 10/1995 | Snitzer | ................. 385/30 |
| 6,031,659 | A | | 2/2000 | Okiyama | |
| 6,111,996 | A | | 8/2000 | Thompson | |
| 6,137,939 | A | * | 10/2000 | Henry et al. | ................ 385/132 |
| 6,434,175 | B1 | * | 8/2002 | Zah | ............... 372/20 |
| 6,549,688 | B1 | * | 4/2003 | Bazylenko | .................. 385/14 |
| 2002/0012161 | A1 | * | 1/2002 | Tsuzaki et al. | ............. 359/334 |
| 2002/0089711 | A1 | * | 7/2002 | Conzone et al. | ............ 359/109 |
| 2002/0154847 | A1 | * | 10/2002 | Dutt et al. | ..................... 385/14 |
| 2003/0044153 | A1 | * | 3/2003 | Bazylenko | ................. 385/129 |

FOREIGN PATENT DOCUMENTS

| WO | WO 98/32196 | 7/1998 |
| WO | US02/33423 | 6/2003 |

OTHER PUBLICATIONS

Hattori, K. et al; Erbium-Doped Silica-Based Waveguide Amplifier Integrated with a 980/1530nm WDM Coupler; Electronic Letters; May 26, 1994; vol. 30, No. 11.

(Continued)

*Primary Examiner*—Brian Healy
*Assistant Examiner*—Eric Wong
(74) *Attorney, Agent, or Firm*—Blakely, Sokoloff, Taylor & Zafman LLP

(57) ABSTRACT

An integrated optical circuit includes waveguides formed in the integrated optical circuit. One set of waveguides is a set of optical amplifiers doped with rare earth ions. A second set of waveguides is a multiplexer or demultiplexer, such as an arrayed waveguide grating (AWG). The set of optical amplifiers and the AWG are coupled together via waveguides formed in the integrated optical circuit. Other elements on the integrated optical circuit are coupled to the set of optical amplifiers and the AWG via optical fibers. The spectral response of the AWG is modified to compensate for the spectral gain of the AWG. The lengths of the individual optical amplifiers in the set of optical amplifiers may be varied to cause uniform power distribution across channels. The integrated optical circuit also has a pump coupler to couple a pump source to the set of optical amplifiers.

14 Claims, 4 Drawing Sheets

OTHER PUBLICATIONS

Parker, Michael C. et al.; Adaptive Chromatic Dispersion Controller Based on an Electro-Optically Chirped Arrayed-Waveguide Grating; Colchester, Essex, CO1 1HH, UK.

Shmulovick, J. et al; Integrated Planar Waveguide Amplifier With 15dB net gain at 1550 nm; Lucent Technologies, Murray Hill, NJ.

Ghosh, Ruby N. et al; 8-mW Threshold Er3+-Doped Planar Waveguide Amplifier; IEEE 1996.

Shmulovich, J. et al; Erbuim-Doped PLanar Waveguide Amplifiers Integraed with Silica Waveguide Technology; Lucent Technologies; Murray Hill, NJ.

Yoshikuni, Y., "Semiconductor Optical Devices for WDM Networks," 10$^{th}$ Inter. Conf. On Indium Phosphide and Related Materials, TSUKUBA, Japan IEEE, (May 11-15, 1998), pp. 18-21.

* cited by examiner

INTEGRATED OPTICAL CIRCUIT HAVING AN INTEGRATED ARRAYED WAVEGUIDE GRATING (AWG) AND OPTICAL AMPLIFIER(S)

BACKGROUND OF THE INVENTION

1. Field of the Invention

The present invention is related to optical systems and components, and in particular to optical systems with integrated optical components.

2. Background Information

A typical optical network includes transceivers, amplifiers, multiplexers and demultiplexers, amplifiers, switches and other components. Each transmitting portion of a transceiver converts an electrical signal to an optical signal and launches the optical signal into an optical fiber. A multiplexer combines the individual optical signals from each optical fiber into a multiple channel optical signal and launches the multiple channel optical signal into an optical fiber. A demultiplexer separates the channels out of the multiple-channel optical signal and launches them into separate fibers. Then each receiving portion of a transceiver accepts an optical signal from a fiber and converts it to an electric signal.

Currently, optical network components are discrete components in that each component performs a single function and is connected by optical fibers to other components. For example, an arrayed waveguide grating (AWG) multiplexer/demultiplexer is produced on one separate integrated circuit (or chip).

Erbium doped fiber amplifiers (EDFA) are also large and bulky subsystems composed of discrete components (the spool of erbium-doped optical fiber, laser to produce pump light, circulators to prevent light back-reflection, fiber combiners to combine pump light and signal light, and other components).

In recent years, erbium doped waveguide amplifiers (EDWA), i.e., discrete amplifiers on chip, have been fabricated as described in "8-mW Threshold $Er^{3+}$-Doped Planar Waveguide Amplifier," by Ruby N. Gosh, et al., published in *IEEE Photonics Technology Letters*, Vol. 8, No. 4, April 1996, as described in "Integrate Planar Waveguide Amplifier with 15 dB gain at 1550 nm," by J. Shmulovich, et al., in Optical Fiber Communications '99 Technical Digest Postdeadline Paper PD-42, San Diego, Calif., 1999, or as described in "Erbium-doped silica-based waveguide amplifier integrated with a 980/1530 nm WDM coupler," by K. Hattori, et al., published in Electronic Letters, Vol. 30, No. 11, May 26, 1994.

The optical network components described above are usually interconnected using optical fiber and fiber connectors. Fiber-to-component interfaces and fiber connectors contribute to optical signal power loss, which causes the need to install even more amplifiers to keep the signal above the noise level. Moreover, with numerous discrete components, the installation, test, reconfiguration of networks is becoming prohibitively difficult and expensive.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

An optical network having integrated optical circuits is described in detail herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring embodiments of various embodiments of the invention.

Some parts of the description will be presented using terms such as waveguide, integrated optical circuit, arrayed waveguide grating (AWG), multiplexer, demultiplexer, waveguide amplifier, gain, wavelength, and so forth. These terms are commonly employed by those skilled in the art to convey the substance of their work to others skilled in the art.

Other parts of the description will be presented in terms of operations performed by a computer system, using terms such as accessing, determining, counting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
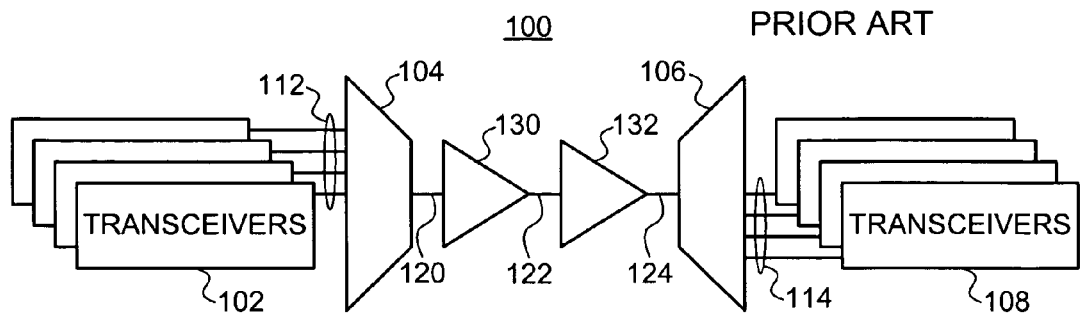
FIG. 1 is a high-level block diagram of a prior art optical network.

FIG. 1 is a high-level block diagram of a prior art optical network 100. The optical network 100 may implement dense wavelength division multiplexing (DWDM), in which multiple wavelengths of light each carrying a separate data stream are combined on a single optical fiber and then separated again at the receiving end.

Common wavelengths include 1530 to 1560 nanometers.

The optical network 100 includes a set of transceivers 102 and 108, which may be n transceivers, and which may launch and receive optical signals into and from optical fibers 112 and 114, respectively, which also may be n optical fibers. The optical fibers 112 and 114 may couple n single channel optical signals to and from multiplexers/demultiplexers 104 and 106, respectively.

The multiplexer/demultiplexer 104 is a discrete component that performs dense wavelength division multiplexing to combine n single channel optical signals received from the transceivers 102 to produce a multiple channel optical signal. The multiplexer/demultiplexer 106 also is a discrete component that performs dense wavelength division demultiplexing to separate n single channel optical signals from a multiple channel optical signal, respectively. The multiplexers/demultiplexers 104 and 106 may be based on thin film filters or fiber Bragg gratings. The multiplexers/demultiplexers 104 and 106 also may be an integrated circuit such as an arrayed waveguide grating (AWG). The optical fibers 120, 122, and 124 are discrete components that couple multiple channel optical signals between the multiplexer/demultiplexer 104, the optical amplifiers 130 and 132, and the multiplexer/demultiplexer 106, as depicted in FIG. 1.

Optical amplifiers 130 and 132 are coupled to the multiplexers/demultiplexers 104 and 106, respectively, to amplify multiple channel optical signals. The optical amplifiers 130 and 132 are n discrete optical amplifiers located at remote points in the optical network 100 as well as adjacent to the multiplexers/demultiplexers 104 and 106. Although described with respect to signal propagation in one direction, the optical network 100 commonly operates bi-directionally, which is well known.

Figure 2:
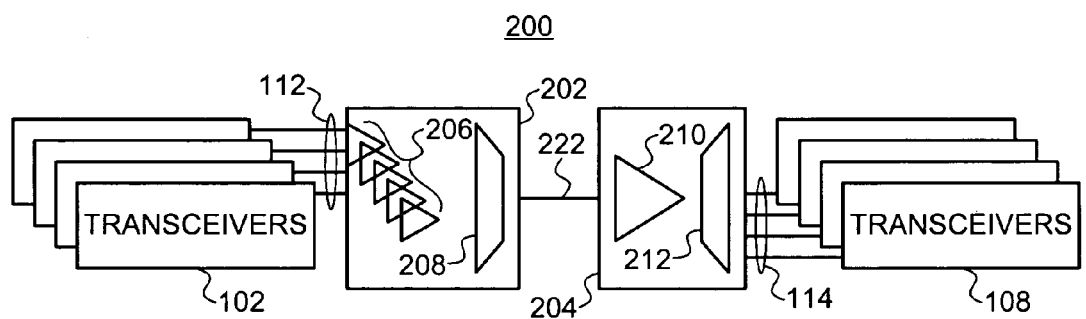
FIG. 2 is a high-level block diagram of an example optical network according to embodiments of the present invention.

FIG. 2 is a high-level block diagram of an optical network 200 according to embodiments of the present invention. One feature of the optical network 200 is integrated optical circuits, which combine multiplexers, demultiplexers, and optical amplifiers on a single chip, coupled to transceivers.

Figure 3:
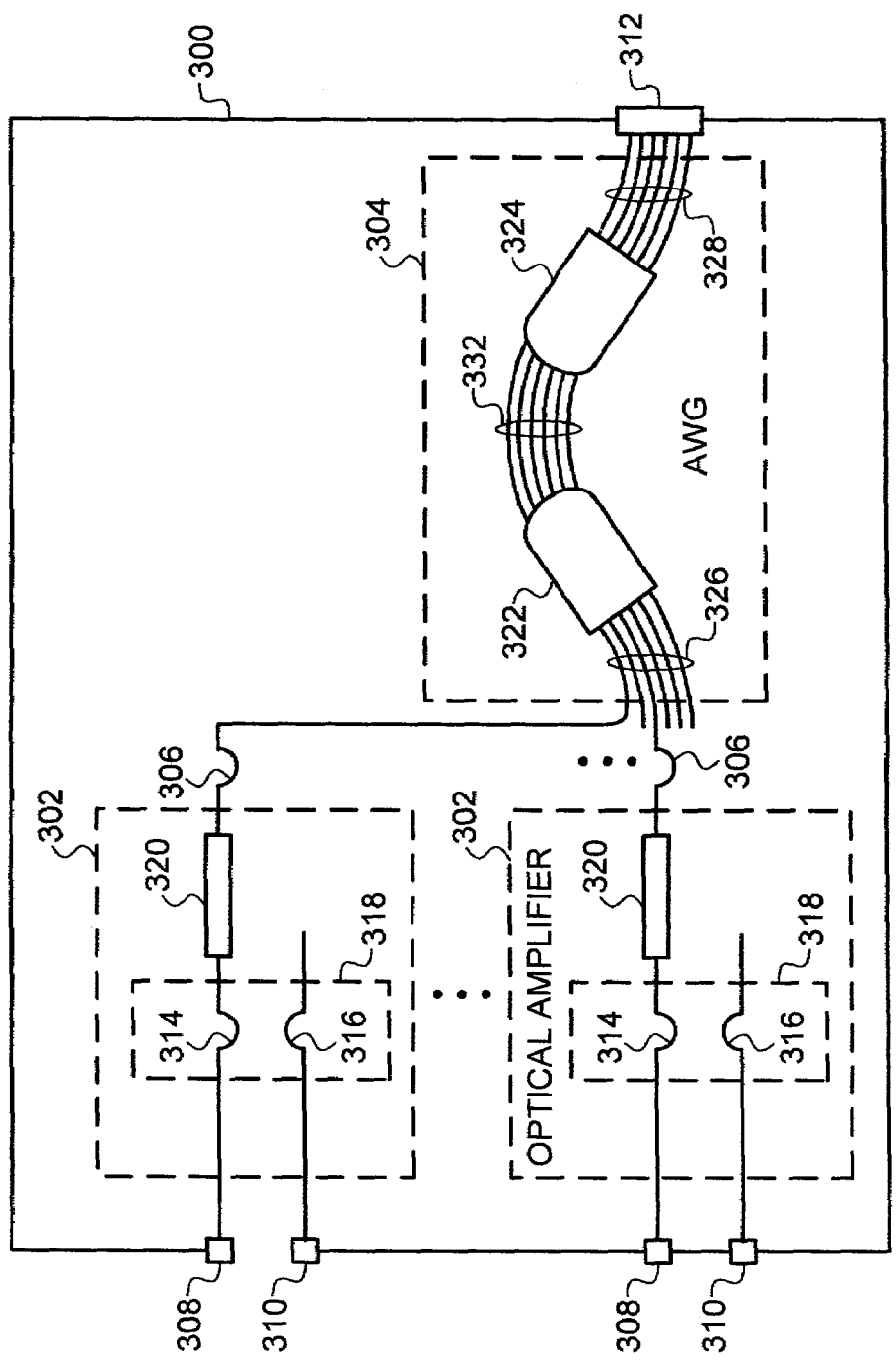
FIG. 3 is a high-level block diagram of an example of the integrated optical circuit depicted in FIG. 2 according to embodiments of the present invention.

For example, the transceivers 102 and 108 are coupled to integrated optical circuits 202 and 204 via the optical fibers 112 and 114, respectively. The integrated optical circuit 202 includes a set of optical amplifiers 206 and a multiplexer 208. The integrated optical circuit 204 includes a single optical amplifier 210 and a demultiplexer 212. The integrated optical circuit 202 is coupled to the integrated optical circuit 204 via an optical fiber 222. Examples embodiments of the integrated optical circuits 202 and 204 are described in more detail with respect to FIG. 3.

For example, an integrated optical circuit 300 includes at least one optical amplifier 302 coupled to an arrayed waveguide grating (AWG) 304 via a waveguide element 306. The integrated optical circuits 202 and 204 also include an optical fiber interface 308, which couples pump light onto the integrated optical circuit 202, an optical fiber interface 310, which couples optical signal light onto the integrated optical circuit 202, and an optical fiber interface 312, which couples optical signal light off of the integrated optical circuit 202. Devices suitable for implementing the optical fiber interfaces 308, 310, and 312 are well known.

In one embodiment, the AWG 304 is demultiplexing a multiple channel optical signal from a single optical amplifier 302 into several single channel optical signals via a single waveguide element 306. In an alternative embodiment, the AWG 304 is multiplexing several single channel optical signals from several optical amplifiers 302 via several waveguide elements 306 into a multiple channel optical signal.

The optical amplifier 302 is coupled to the optical fiber interfaces 308 and 310 via pump light waveguide element 314 and optical signal light waveguide element 316, respectively. The optical amplifier 302 includes a combiner 318, which may combine pump light with optical signal light. In one embodiment, the combiner 318 is formed as an evanescent coupler between the waveguide elements 314 and 316. The optical amplifier 302 also includes a gain section 320, which in one embodiment is the waveguide element 314 locally doped (e.g., sputtered) with an active substance, such as erbium or other rare earth ions.

The AWG 304 performs wavelength division multiplexing by passing light through a grating made up of several optical waveguide elements of predetermined different lengths and shapes. For example, the AWG 304 includes an input star coupler 322 and an output star coupler 324, which optically couple two ends of an optical waveguide array 332, respectively, with an input set of waveguide elements 326 and an output set of waveguide elements 328, respectively. The output set of waveguide elements 328 are coupled to the optical fiber interface 312. Because all components on the integrated optical circuit 202 are coupled via waveguide elements, there is less optical power loss than encountered when coupling discrete optical components via optical fiber.

One feature of the example integrated optical circuit 202 is that all of the channels within a multiple channel optical signal being amplified by the optical amplifier 302 are amplified in the gain section 320. Gain in this embodiment may be limited by the total power available from a pump source, however. Moreover, different wavelengths (or channels) experience different amounts of gain as determined by the strength of the coupling of the transition in the active substance (e.g., erbium ions) during amplification. The example optical amplifier 302 amplifies the channel with the greatest incoming amplitude more, which is to the detriment of weaker incoming channels. The non-uniform channel amplification may cause lower signal-to-noise ratios (SNR) for the under-amplified channels. Additionally, AWGs, such as the AWG 304, commonly have a non-uniform transmission spectrum (i.e., dependence of the transmission on wavelength).

In one embodiment, the design of the waveguide elements in the AWG 304 is adjusted to compensate for non-uniform channel amplification. In one embodiment, the shape and width of the waveguides are varied at the junction between the star couplers 322 and 324 and the waveguide array 332. This produces different distributions of intensity of light at the junction between star coupler 324 and output waveguide elements 328, and therefore different distribution of transmission over the waveguide elements 328.

Figure 4:
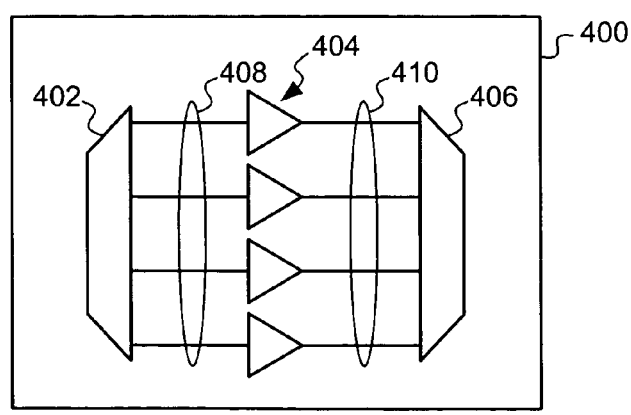
FIG. 4 is a high-level block diagram of an alternative example of an integrated optical circuit according to embodiments of the present invention.

FIG. 4 is a high-level block diagram of an alternative example integrated optical circuit 400 according to embodiments of the present invention. The example integrated optical circuit 400 includes an AWG 402 coupled to a set of optical amplifiers 404 and an AWG 408 via a set of waveguide elements 408 and 410. The example can be included in an optical network such as the optical network 200. During operation, the example AWG 402 demultiplexes a multiple channel optical signal into several single channel optical signals. Each single channel optical signal is amplified separately by one of the optical amplifiers in the set of optical amplifiers 404. The AWG 406 then multiplexes then amplifies single channel optical signals. The parameters of each optical amplifier in the set of optical amplifiers 404 are chosen to give equal gain to each channel.

Figure 5:
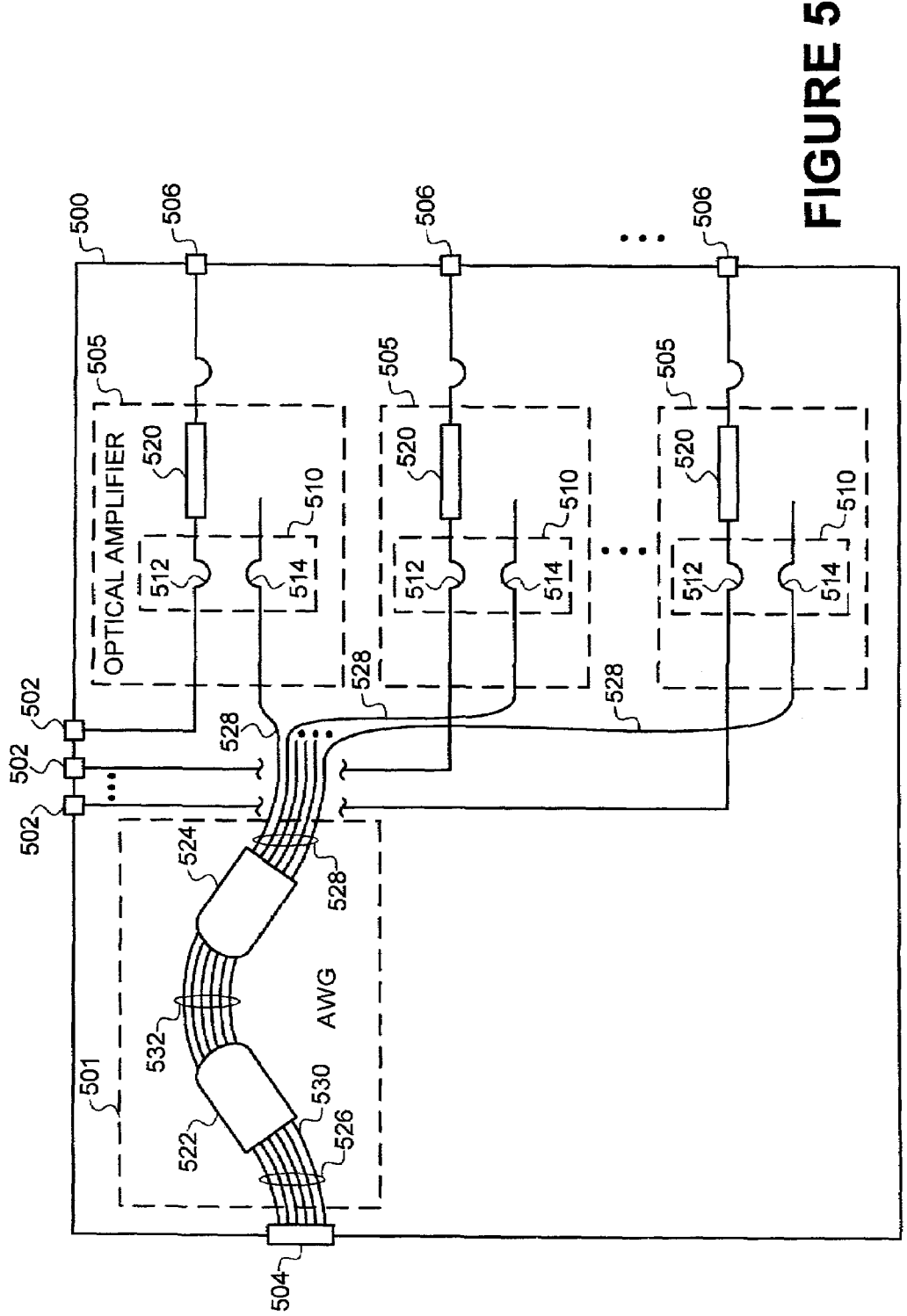
FIG. 5 is a high-level block diagram of an alternative example integrated optical circuit according to embodiments of the present invention.

FIG. 5 is a high-level block diagram of an alternative example integrated optical circuit 500 according to embodiments of the present invention. The example integrated optical circuit 500 includes set of optical fiber interfaces 502, which couples pump light onto the integrated optical circuit 500, an optical fiber interface 504, which couples optical signal light onto the integrated optical circuit 500, and a set of optical fiber interfaces 506, which couples optical signal light off of the integrated optical circuit 106. Devices suitable for implementing the optical fiber interfaces 502, 504, and 506 are well known.

The example integrated optical circuit 500 includes an AWG 501, which includes an input star coupler 522 and an output star coupler 524, which may optically couple two ends of an optical waveguide array 532, respectively, with an input set of waveguide elements 526 and an output set of waveguide elements 528, respectively. The output set of waveguide elements 528 are coupled to a set of optical amplifiers 505.

The set of optical amplifiers 505 includes a set of combiners 510 comprised of a set of pump light waveguide elements 512 and a set of optical signal waveguide elements 514. The set of optical amplifiers 505 also includes a set of gain sections 520. According to the embodiment illustrated in FIG. 5, each individual optical amplifier 505 may amplify one of n single channel optical signals. In one embodiment, the lengths of the individual optical amplifiers are tailored to compensate for the non-uniform gain spectrum of the AWG 501.

Figure 6:
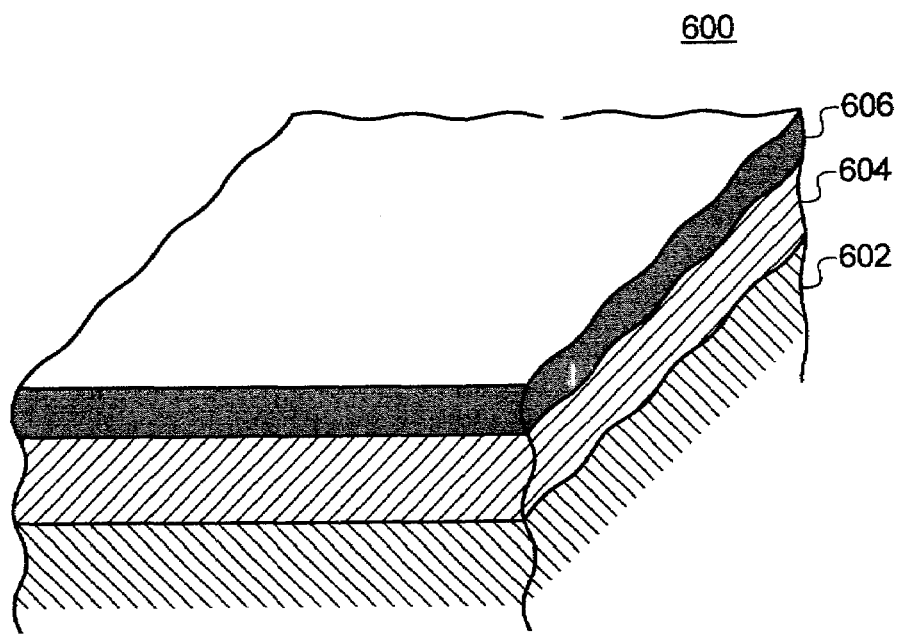
FIGS. 6 and 7 are cross-section diagrams of successive stages in the fabrication of the integrated optical circuit depicted in FIGS. 2, 3, 4, and 5 according to embodiments of the present invention.

An integrated optical circuit according to embodiments of the present invention (e.g., the integrated optical circuits 202, 204, 300, 400, and/or 500) is a planar lightwave circuits (PLC) on a silicon substrate manufactured using suitable semiconductor processing equipment. FIG. 6 is a cross-section diagram 600 showing a process for fabricating integrated optical circuits according to an embodiment of the present invention. A layer 604 of silica ($SiO_2$) may be deposited on a silicon substrate 602 to form the lower cladding for optical waveguides, using thermal oxidation, for example. A layer 606 of silica, germanium, and erbium (e.g., $SiO_2+Ge+Er^{3+}$) may be deposited on the first layer of $SiO_2$ using flame hydrolysis deposition or chemical vapor deposition, for example.

Figure 7:
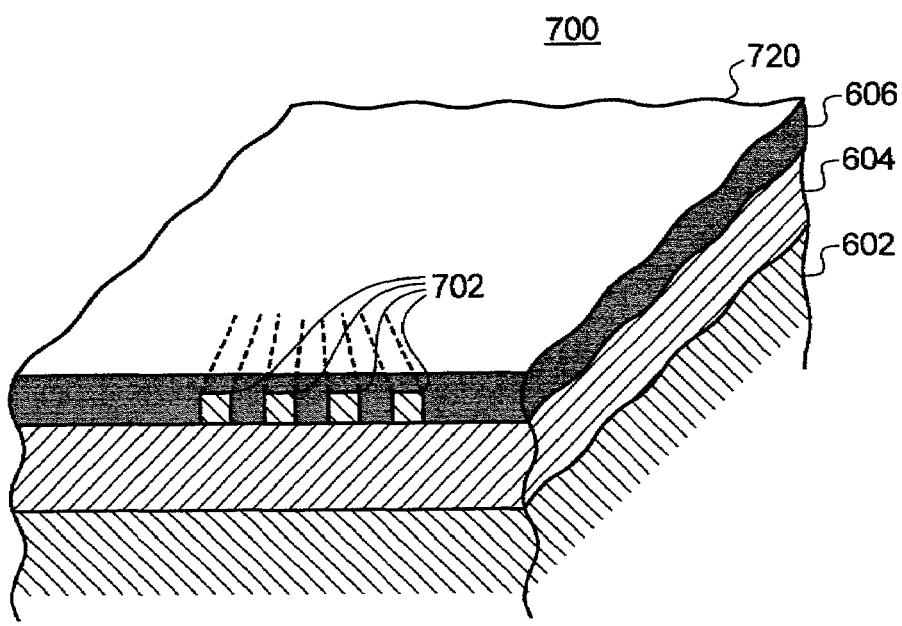

FIG. 7 is a cross-section diagram showing a further process for fabricating an integrated optical circuit according to embodiments of the present invention (e.g., the integrated optical circuits 202, 204, 300, 400, and/or 500). For example, several waveguide core elements 702 are formed on the integrated optical circuit 106 using chemical processes to remove all but selective portions of the layer 406 of $SiO_2+Ge+Er^{3+}$, by reactive ion etching, for example. A layer 720 of $SiO_2$ may be deposited over the optical waveguide elements 702, using flame hydrolysis deposition or chemical vapor deposition, for example.

There are several advantages of an optical network having the integrated optical circuit 106, which integrates optical components onto a single chip. First is reduced cost because the individual integrated optical circuits (e.g., optical amplifiers with AWGs) may be fabricated in the same processes as electronic components (e.g., by semiconductor processes in the fabrication facilities). This means that adding more components on the chip provides the functionality of several discrete components for a small increment in price compared with one integrated component.

Second is power savings because by integrating the components on a single chip there are fewer optical losses because there are fewer connections via optical fiber. Conventionally, each discrete component is connected via optical fiber and each connection introduces power losses, and power losses are cumulative across connections.

Third is space savings in the optical network, which means that chips may be smaller and conventional rack-based subsystems can be scaled down to card-based subsystems. Moreover, card-based subsystems also offer cost savings in systems integration and system testing.

Embodiments of the invention can be implemented using hardware, software, or a combination of hardware and software. Such implementations include state machines and application specific integrated circuits (ASICs). In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
    a set of transceivers to couple a set of optical channels; and
    an integrated optical circuit coupled to receive the set of optical channels from the set of transceivers, the integrated optical circuit having:
        a silica-based set of optical amplifiers formed in the integrated optical circuit, an individual optical amplifier being a silica-based optical amplifier, an individual optical amplifier having an evanescent coupler to combine pump light with optical signal light, an individual optical amplifier having a gain section to amplify the combined pump light and optical signal light;
        a silica-based arrayed waveguide grating (AWG) formed in the integrated optical circuit and coupled to the set of optical amplifiers; and
        a set of waveguide elements coupled to outputs of the set of optical amplifiers,
        the AWG having a star coupler coupled to the waveguide elements.

2. The system of claim 1, further comprising a set of optical fibers to couple the set of transceivers to the integrated optical circuit.

3. The system of claim 1, wherein the set of optical amplifiers comprises a set of waveguide elements to combine pump light and optical signal light.

4. The system of claim 3, wherein the set of optical amplifiers includes a set of gain portions coupled to the set of waveguide elements.

5. The system of claim 4, wherein the set of optical signals includes a multiple channel optical signal and the AWG is coupled to demultiplex the multiple channel optical signal into a set of single channel optical signals.

6. The system of claim 4, wherein the set of optical signals includes a set of single channel optical signals and the AWG is coupled to multiplex the set of single channel optical signals into a multiple channel optical signal.

7. An apparatus, comprising:
   an integrated optical circuit having:
      a set of optical amplifiers formed in the integrated optical circuit, an individual optical amplifier being a silica-based optical amplifier having a silica-based core, an individual optical amplifier having an evanescent coupler to combine pump light with optical signal light, an individual optical amplifier having a gain section to amplify the combined pump light and optical signal light;
      an arrayed waveguide grating (AWG) formed in the integrated optical circuit and coupled to the set of optical amplifiers, the arrayed waveguide grating (AWG) being a silica-based arrayed waveguide grating (AWG); and
      a set of waveguide elements coupled to outputs of the set of optical amplifiers,
      the AWG having a star coupler coupled to the waveguide elements.

8. The apparatus of claim 7, wherein the AWG is coupled to a set of optical amplifiers inputs via a set of input waveguide elements.

9. The apparatus of claim 8, wherein the AWG is coupled to a set of optical amplifier outputs via a set of output waveguide elements.

10. The apparatus of claim 7, wherein an individual gain section is coupled to an individual waveguide element.

11. The apparatus of claim 7, wherein each optical amplifier in the set of optical amplifiers has a predetermined length to compensate for non-uniform gain spectrum of the AWG.

12. The apparatus of claim 7, further comprising a pump interface to couple pump light to the set of optical amplifiers.

13. The apparatus of claim 7, further comprising an optical signal interface to couple optical signal light to the AWG.

14. The apparatus of claim 7, wherein the AWG includes a waveguide array, wherein a shape and width of each waveguide in the waveguide array is varied to produce a varied light distribution in the AWG waveguide array.

* * * * *